United States Patent
Gill et al.

(10) Patent No.: US 11,035,989 B2
(45) Date of Patent: Jun. 15, 2021

(54) SYSTEMS AND METHODS FOR IMPROVING RESOLUTION IN LENSLESS IMAGING

(71) Applicant: Rambus Inc., Sunnyvale, CA (US)

(72) Inventors: Patrick R. Gill, Sunnyvale, CA (US); David G. Stork, Portola Valley, CA (US); John Eric Linstadt, Palo Alto, CA (US)

(73) Assignee: Rambus Inc., San Jose, CA (US)

( * ) Notice: Subject to any disclaimer, the term of this patent is extended or adjusted under 35 U.S.C. 154(b) by 291 days.

(21) Appl. No.: 15/776,386

(22) PCT Filed: Nov. 3, 2016

(86) PCT No.: PCT/US2016/060250
§ 371 (c)(1),
(2) Date: May 15, 2018

(87) PCT Pub. No.: WO2017/095587
PCT Pub. Date: Jun. 8, 2017

(65) Prior Publication Data
US 2018/0329185 A1    Nov. 15, 2018

Related U.S. Application Data

(60) Provisional application No. 62/261,013, filed on Nov. 30, 2015.

(51) Int. Cl.
*G02B 5/18* (2006.01)
*H04N 5/225* (2006.01)
(Continued)

(52) U.S. Cl.
CPC .......... *G02B 5/1871* (2013.01); *G02B 13/14* (2013.01); *G03H 1/0465* (2013.01); *H04N 5/2254* (2013.01); *G03H 2001/045* (2013.01)

(58) Field of Classification Search
None
See application file for complete search history.

(56) References Cited

U.S. PATENT DOCUMENTS

| 6,570,145 B2 | 5/2003 | Huang et al. |
| 9,678,474 B2 * | 6/2017 | Mokhnatyuk ..... H01L 27/14627 |

(Continued)

OTHER PUBLICATIONS

Garcia-Martinez et al., "Generation of Bessel Beam Arrays Through Dammann Gratings", Mar. 20, 2012, vol. 51, No. 9, Applied Optics. pp. 1375-1381. 7 Pages.

(Continued)

*Primary Examiner* — Kevin Ky
(74) *Attorney, Agent, or Firm* — Sillon Edge Law Group LLP; Arthur J. Behiel

(57) ABSTRACT

An imaging system includes a phase grating overlying a two-dimensional array of pixels, which may be thermally sensitive pixels for use in infrared imaging. The phase grating comprises a two-dimensional array of identical sub-gratings that define a system of Cartesian coordinates. The subgrating and pixel arrays are sized and oriented such that the pixels are evenly distributed with respect to the row and column intersections of the subgratings. The location of each pixel thus maps to a unique location beneath a virtual archetypical subgrating. Portions of the phase grating extend beyond the edges of the pixels array to interference pattern in support of Fourier-domain imaging.

14 Claims, 14 Drawing Sheets

(51) Int. Cl.
*G02B 13/14* (2006.01)
*G03H 1/04* (2006.01)

(56) References Cited

U.S. PATENT DOCUMENTS

| | | |
|---|---|---|
| 2004/0109068 A1 | 6/2004 | Mitsunaga et al. |
| 2013/0202081 A1* | 8/2013 | Rossl .................. A61B 6/4035 |
| | | 378/36 |
| 2013/0208864 A1 | 8/2013 | Rossl |
| 2014/0185746 A1* | 7/2014 | Baturin .................... G21K 1/06 |
| | | 378/36 |
| 2015/0101002 A1* | 4/2015 | Yamashita ....... H04N 21/23895 |
| | | 725/116 |
| 2015/0293018 A1* | 10/2015 | Stork ................. G02B 27/0075 |
| | | 250/550 |
| 2017/0217242 A1* | 8/2017 | Lochbihler .......... B42D 25/328 |

OTHER PUBLICATIONS

Guerineau et al., "Generation of Achromatic and Propagation-Invariant Spot Arrays by Use of Continuously Self-Imaging Gratings," Apr. 1, 2001, vol. 26, No. 7, Optics Letters. pp. 411-413. 3 Pages.

Notification Concerning Transmittal of International Preliminary Report on Patentability dated Jun. 14, 2018 re: Int'l Appln. No. PCT/US2016/060250. 7 Pages.

Notification of Transmittal of the International Search Report and the Written Opinion of the International Searching Authority dated Feb. 3, 2017 re: Int'l Appln. No. PCT/US16/060250. 14 Pages.

\* cited by examiner

SYSTEMS AND METHODS FOR IMPROVING RESOLUTION IN LENSLESS IMAGING

BACKGROUND

Focusing optics and related components contribute significantly to the cost and size of common imaging devices. The materials used in the manufacture of infrared (IR) lenses (e.g., monocrystalline Germanium) are particularly expensive, and the cost of IR lenses tends to scale with the cube of their linear size. As a result, IR imaging devices tend to be cost prohibitive.

BRIEF DESCRIPTION OF THE DRAWINGS

The detailed description is illustrated by way of example, and not by way of limitation, in the figures of the accompanying drawings and in which like reference numerals refer to similar elements and in which:

FIGS. 8A and 8B.

DETAILED DESCRIPTION

Figure 1:
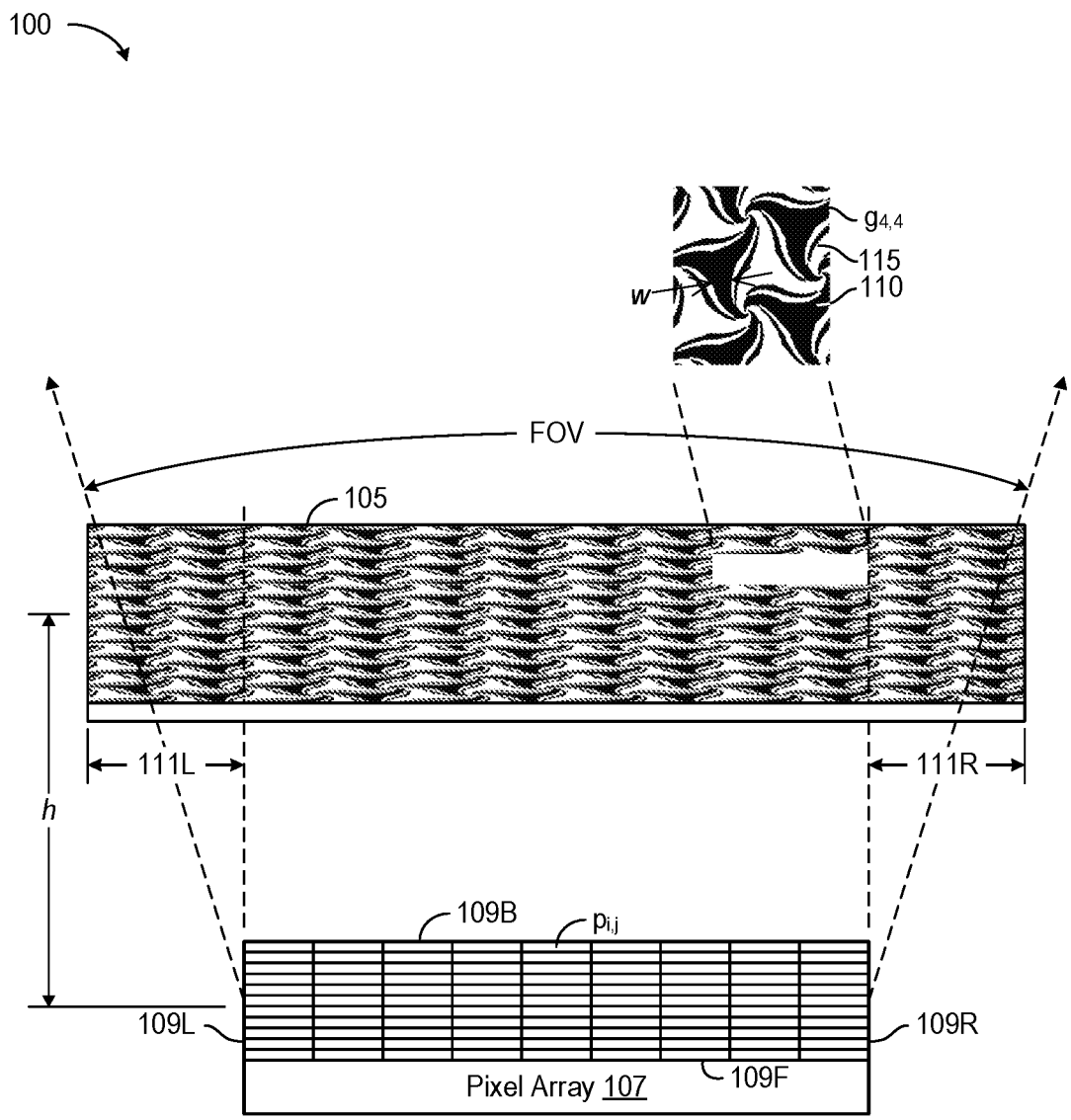
FIG. 1 depicts an infrared (IR) imaging device 100 that employs a phase grating in lieu of a lens.

FIG. 1 depicts an infrared (IR) imaging device 100 that employs a phase grating in lieu of a lens. Employing a phase grating in lieu of a lens can dramatically reduce size and cost. Viewed from a perspective normal to the active surface, device 100 includes a phase grating layer 105 spaced by a height h above an array 107 of pixels $p_{i,j}$, where i and j refer to locations along the respective X and Y axes. Grating layer 105 includes a repeating pattern of subgratings $g_{i,j}$, of which one subgrating $g_{4,4}$ is shown from the normal perspective for ease is viewing; the remaining subgratings $g_{i,j}$ are identical in this example.

Pixel array 107 includes a first edge 109L, a second edge 109R, a third edge 109F, and a fourth edge 109B. Phase grating layer 105 includes left and right portions 111L and 111R that extend beyond the respective left and right edges of the underlying pixel array 107. Portions 111L and 111R are columns of subgratings that repeat the pattern of subgratings $g_{i,j}$ that extends over and between left and right edges 109L and 109R. Rows of repeating subgratings likewise extend beyond the respective front and back edges 109F and 109B of pixel array 107. The overlapping portions extend over the field of view FOV for imaging device 100.

Phase gratings of the type used for subgratings gi,j are detailed in U.S. patent application Ser. No. 14/677,878 to Stork et al, which issued 25 Dec. 2018 as U.S. Pat. No. 10,161,788 and is incorporated herein by this reference. Briefly, and in connection with subgrating g4,4, subgratings gi,j are of a material that is transparent to IR light. The surface of subgratings gi,j includes transparent features 110 (black) and 115 (white) that define between them boundaries of odd symmetry. Features 110 are raised in the Z dimension (normal to the view) relative to features 115, and are shown in black to elucidate this topography. Features 110 and 115 form six-armed spiral shapes in this embodiment (the black and white features both contribute "arms" that contribute to the point-spread function of the grating). The width W of the thickest portion of the arms is about 120 microns. As detailed below, the boundaries between features 110 and 115 produce an interference pattern on the underlying pixel array that contains rich spatial information about an imaged scene. This spatial information can be processed using e.g. Fourier- or spatial-domain deconvolution to render photographs or identify features of interest in the imaged scene.

Fourier-domain image reconstruction implicitly assumes that the point-spread function of the imaged interference pattern wraps around at the edges of the pattern. The portions of grating array 105 that extend beyond the edges of pixel array 107 (e.g., portions 111L and 111R) extend the interference pattern in support of Fourier-domain strategies. Subgratings $g_{i,j}$ are tiled with copies along the borders of array 105 that extend out from pixel array 107 to cover all angles from which incident light is likely to strike array 107.

Figure 2:
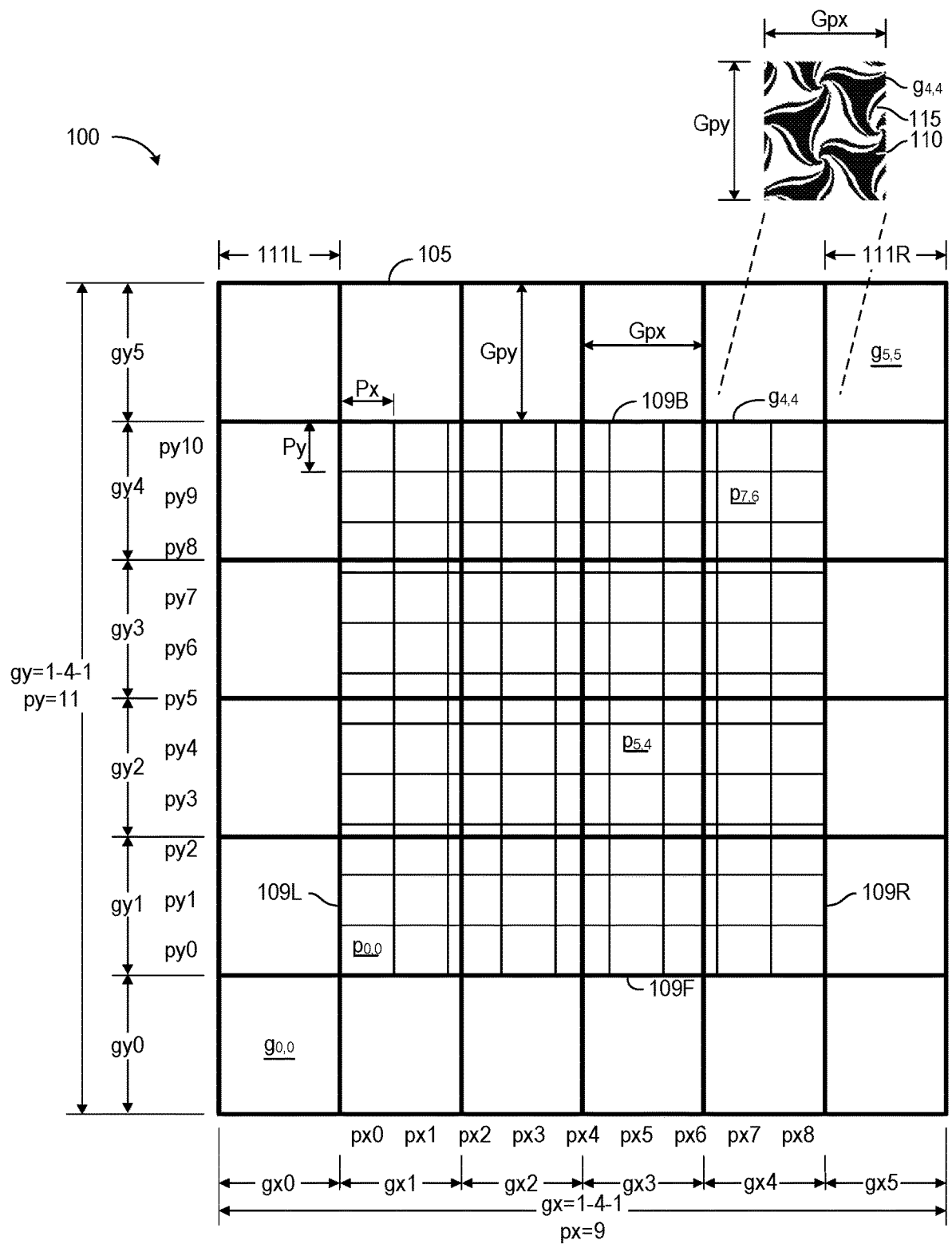
FIG. 2 is a plan view of imaging device 100 of FIG. 1.

FIG. 2 is a plan view of imaging device 100 of FIG. 1. Of the repeating pattern of subgratings $g_{i,j}$, only subgrating $g_{4,4}$ is shown in detail; the remaining subgratings $g_{i,j}$ are identical in this example, and are highlighted using bold boundaries to show their placement, orientation, and size relative to underlying pixels $p_{i,j}$. Subgratings $g_{i,j}$ are rectangular in this embodiment, with a minimum dimension Gpx in the x dimension and a maximum dimension Gpy in the y dimension, though the subgratings can be different shapes and sizes in other embodiments.

Subgratings $g_{i,j}$ are arranged in a two-dimensional array with a number gx along the X axis and a number gy along the Y axis. Both subgrating numbers gx and gy are six in this simple example, but either or both numbers can be the same or different. The array of pixels $p_{i,j}$ includes a number px along the X axis and a number py along the Y axis. Numbers px and py are nine and eleven, respectively, but either or both can be different.

Pixel count px is coprime with the subgrating count gx along the X axis and between edges 109L and 109R; that is, pixel numbers px and gx between portions 111L and 111R share no common integer factor other than one. Likewise, the pixel count py is coprime with the subgrating count gy along the Y axis and between edges 109F and 109B. With this arrangement, imaging device 100 obtains px times py independent samples of the interference pattern created by a single instance of a subgrating $g_{i,j}$. The effective pixel pitch is 1/gy times pixel pitch Py in the Y dimension and 1/px times the pixel pitch Px in the X dimension. Unless otherwise specified, the X and Y dimensions refer to the Cartesian coordinate system defined by the array of subgratings.

Though not shown, pixel arrays can include superfluous pixel structures that are e.g. defective or redundant and/or for various other reasons may not be used for image capture. Such superfluous structures may not be "pixels" as that term is used herein, as that term generally refers to elements that provide a measurement of illumination that is used for image acquisition. Redundant pixels can be used to take multiple measurements of pixels in equivalent positions, reducing noise.

Figure 3:
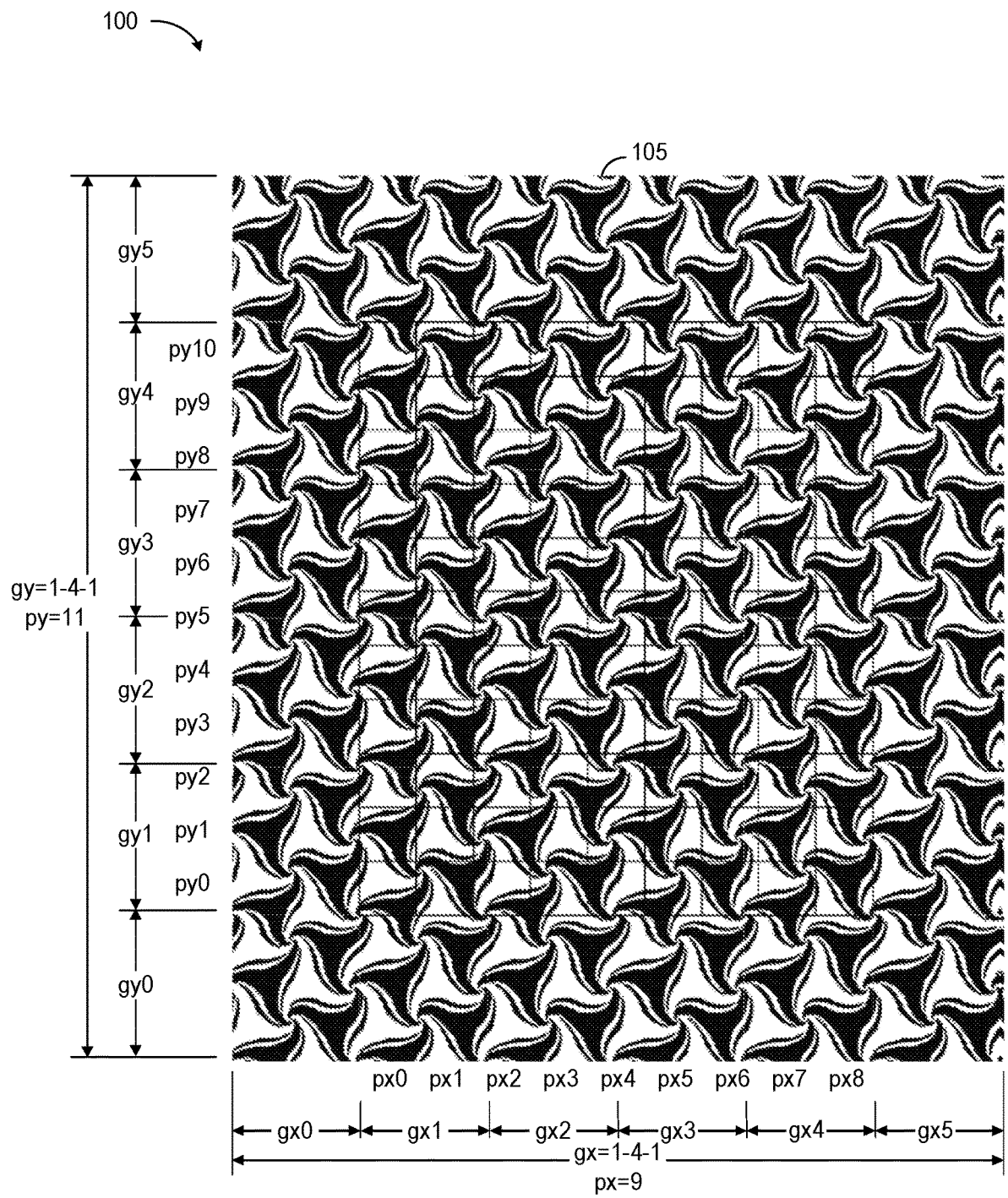
FIG. 3 shows IR imaging device 100 of FIGS. 1 and 2 with the full tessellation of subgratings $g_{i,j}$ that make up phase grating layer 105.

FIG. 3 shows IR imaging device 100 of FIGS. 1 and 2 with the full tessellation of subgratings $g_{i,j}$ that make up phase grating layer 105. The boundaries between subgratings $g_{i,j}$ are contiguous across tessellation borders, so the borders are not easily visible. Individual subgratings are nevertheless readily identifiable with reference to their Cartesian coordinates expressed along the X axis as gx[5:0] and along the Y axis as gy[5:0]. For example, subgrating $g_{5,5}$ in the upper right corner is located in the intersection of column gx5 and row gy5. Pixels $p_{i,j}$ are likewise identifiable along the X axis as px[8:0] and along the Y axis as py[10:0].

Figure 4:
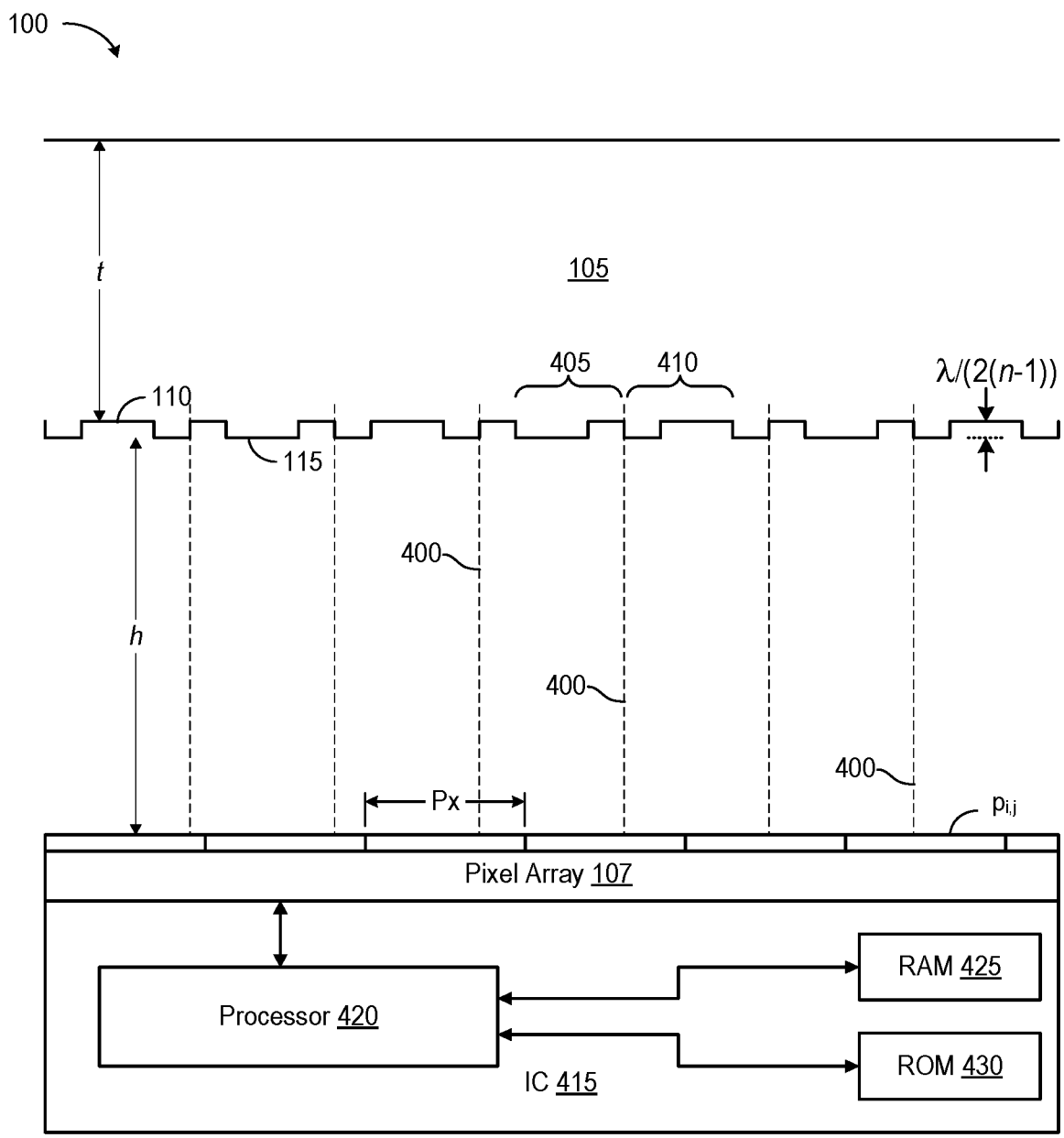
FIG. 4 is a cut-away view of imaging device 100 of FIGS. 1-3.

FIG. 4 is a cut-away view of imaging device 100 of FIGS. 1-3. Grating layer 105 is a binary, odd-symmetry silicon phase grating of thickness t separated from pixel array 107 array of pixels $p_{i,j}$ by an air interface of optical height h equal to 300 μm. (In general, optical height h is the sum, for every material between grating 105 and pixel array 107, of the physical height divided by the index of refraction through that material. Silicon is a relatively inexpensive material that has high IR transmission, and it can be patterned using well-known semiconductor processes. Other materials are suitable, however, and can be selected for different wavelengths, or for other material or cost considerations. Thickness t and height h are 500 μm and 300 μm, respectively. Pixel pitch Px along the X dimension is about 100 μm; pixel pitch Py (FIG. 2) is similar. Any or all of these dimensions can vary in other embodiments.

Height h can be related to the wavelength of incident light, width W of widest portions of phase features 110 and 115, and the grating design. The phase features contain some extended elements longer than they are wide. Let the typical widths of these elements be W and a wavelength within the band of interest be l. Height h, the effective optical vertical separation between phase-generating layer 105 and pixel array 107, follows the formula $h=W^2/(k*l)$ where "k" is a constant governed by the grating design. For phase antisymmetric gratings using two free parameters (or "interference fringes"), the optimal value for k may be in the range of two to six; more generally k may range from approximately 0.3 to 10. Broadly speaking, the optimal k tends to be towards the low end of this range in designs using more interference fringes, and towards the higher end of this range with smaller numbers of interference fringes. In one embodiment, width W of one of the thickest arms is about 120 microns, the effective optical height h is 416 microns, and the wavelength l is about 10 microns. Substituting into the formula $k=W^2/l/h$, the value k for this embodiment is about 3.4. Grating 105 has a value k in the range of from about two to six, though k can be outside this range (e.g., between 1.5 and 5) in other embodiments.

Adjacent features 110 and 115 form six illustrative odd-symmetry boundaries 400, each indicated using a vertical, dashed line. The lower features 115 induce phase retardations of half a wavelength (π radians) relative to upper features 110. Features 405 and 410 on either side of each boundary exhibit odd symmetry. With this arrangement, paired features induce respective phase delays that differ by approximately half a wavelength λ over the wavelength band of interest, approximately 5 μm (half of 10 μm) in this example for imaging within the IR spectrum. The different phase delays produce curtains of destructive interference separated by relatively bright foci to produce an interference pattern on pixel array 107. Stepped features 405 and 410 are of uniform width in this simple illustration, but vary across each subgrating $g_{i,j}$ and collection of subgratings. Curved and divergent boundaries of odd symmetry, as illustrated in FIGS. 1-3, provide rich patterns of spatial modulations that can be processed to extract photos and other image information from a scene.

Pixel array 107, also called a "thermographic" or "thermal-imaging" array, can be cooled to support certain types of IR sensitive semiconductors. Cooling adds complexity and cost, and requires power. The pixels in uncooled detectors are mostly based on pyroelectric and ferroelectric materials or microbolometer technology. Uncooled sensors may provide inferior image quality, but can be substantially simpler, smaller, and less expensive.

Imaging device 100 includes an integrated circuit (IC) device 415 that supports image acquisition and processing. IC 415 includes a processor 420, random-access memory (RAM) 425, and read-only memory (ROM) 430. ROM 430 can store a digital representation of the point-spread function (PSF) of grating layer 105 from which a noise-dependent deconvolution kernel may be computed. ROM 430 can also store the deconvolution along with other parameters or lookup tables in support of image processing. Processor 420 captures digital image data from the pixel array and uses that data with the stored PSF to compute e.g. images and other image data. Processor 420 uses RAM 425 to read and write data in support of image processing. Processor 420 may support specialized processing elements that aid fast, power-efficient Fourier- or spatial-domain deconvolution, for example. All the components of device 100 can be integrated into the same device or package using microfabrication techniques.

Figure 5:
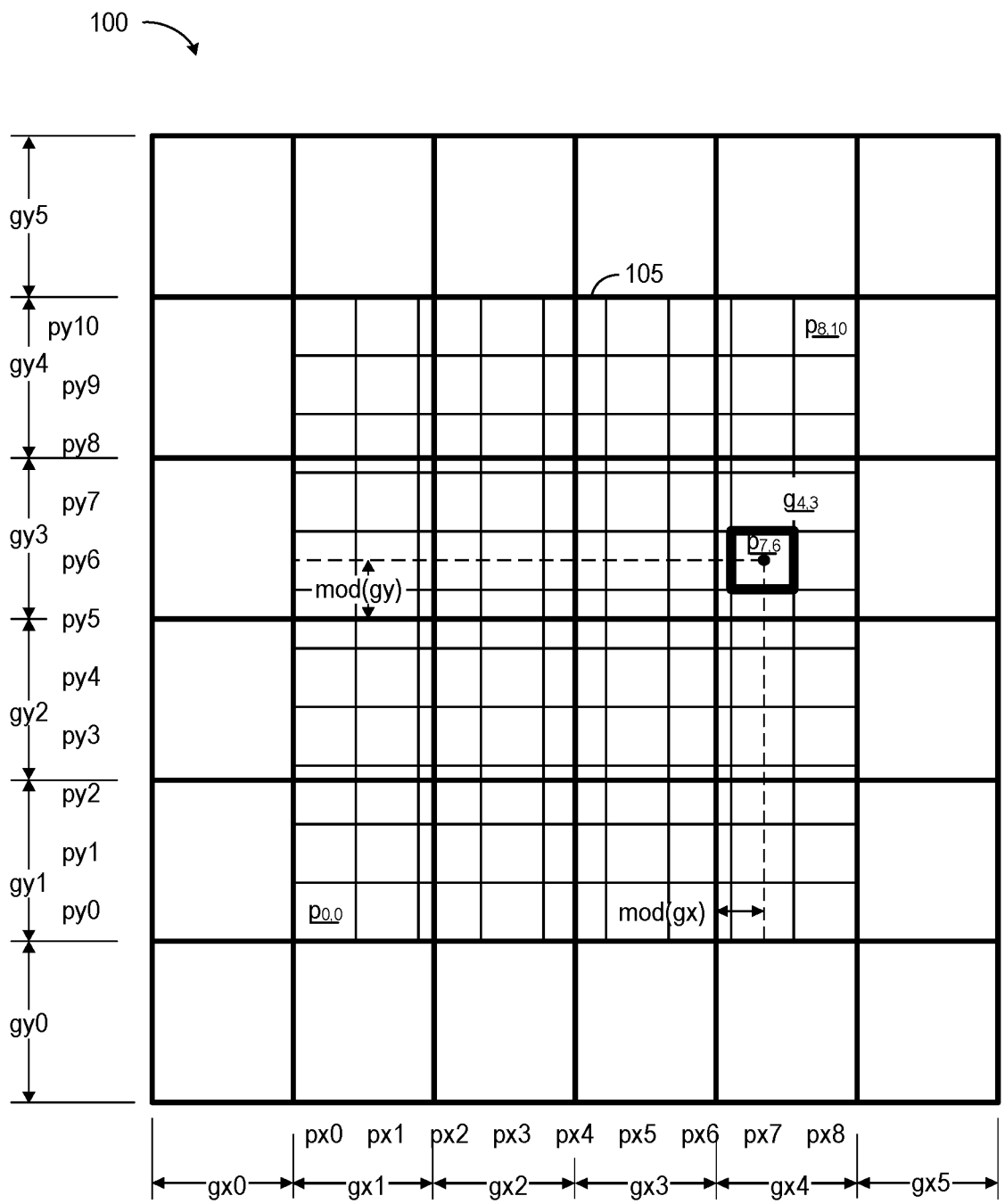
FIG. 5 depicts imaging device 100 with the details of subgratings $g_{i,j}$ obscured for ease of illustration.

FIG. 5 depicts imaging device 100 with the details of subgratings $g_{i,j}$ obscured for ease of illustration. The boundaries of subgratings $g_{i,j}$ are highlighted using lines that are bold relative to those of the underlying array of pixels $p_{i,j}$. A single pixel $p_{7,6}$ is also highlighted using a bold border. A dot in the center of pixel $p_{7,6}$ serves as a reference for pixel position relative to the subgrating array, and need not correspond to any physical structure. A point elsewhere on each pixel—e.g. a corner—could serve as a similar reference.

The center of pixel $p_{7,6}$, with reference to the array of subgratings, is located at gx3+mod(px7,gx) in the X dimension and gy2+mod(py6,gy) in the Y dimension. The displacements mod(px7,gx) and mod(py6,gy) place the center of pixel $p_{7,6}$ within overlaying subgrating $g_{4,3}$. The combination of mod(px7,gx) and mod(py6,gy) for pixel $p_{7,6}$ is unique among pixels $p_{i,j}$ with reference to their corresponding subgratings. The same is true of the remaining pixels. That is, no two pixels $p_{i,j}$ are located at the same position relative to their respective subgrating. Moreover, the modulo coordinates are evenly spaced along the X and Y axes.

Figure 6:
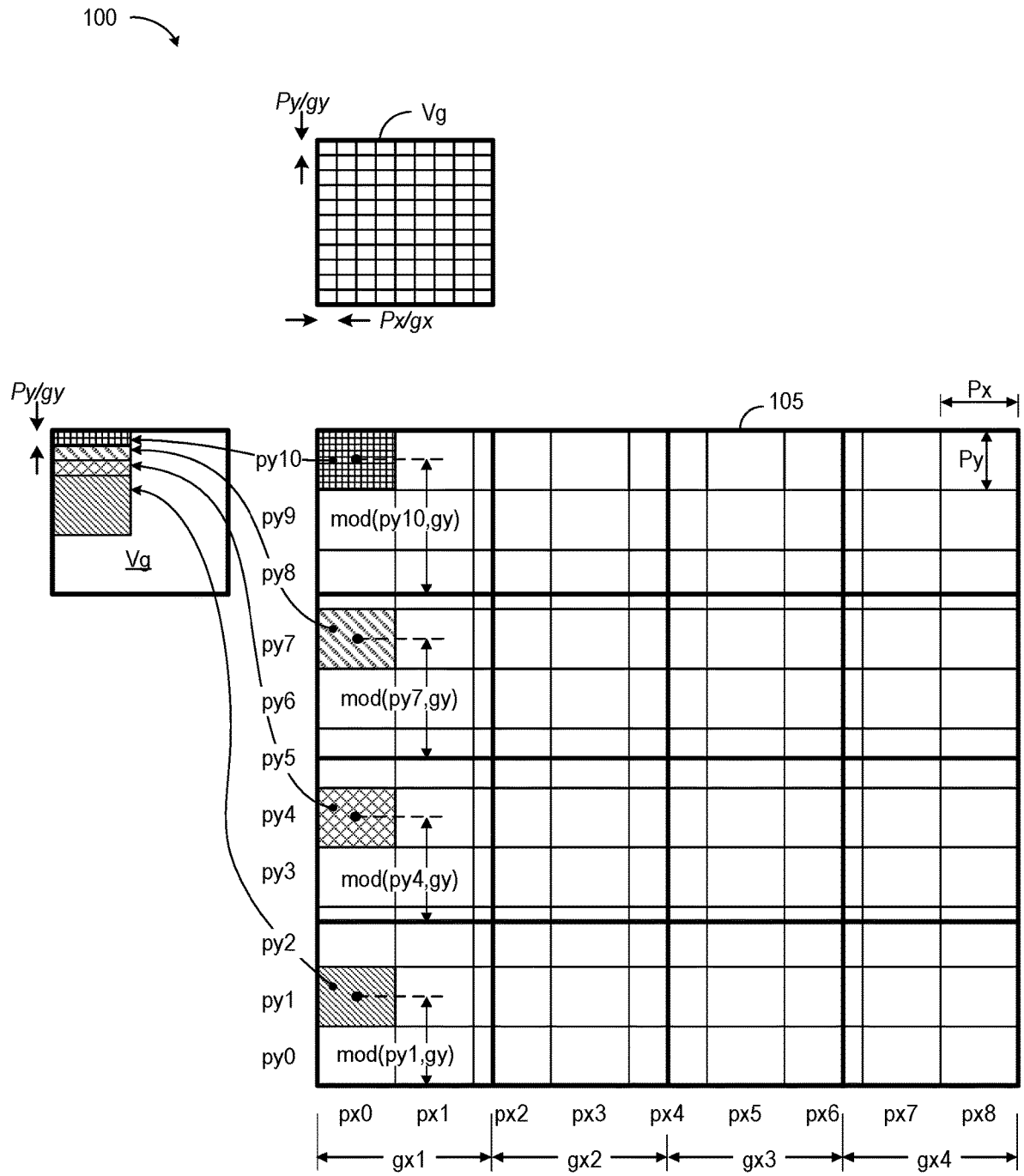
FIG. 6 depicts imaging device 100, again with the details of subgratings $g_{i,j}$ obscured for ease of illustration, with certain pixels shaded to illustrate their respective contributions.

FIG. 6 depicts imaging device 100, again with the details of subgratings $g_{i,j}$ obscured for ease of illustration, with certain pixels shaded to illustrate their respective contributions. Each physical pixel $p_{i,j}$ maps to a virtual location, similarly shaded, beneath a virtual archetypical subgrating Vg (at left). In the Y dimension, each of the four highlighted pixels is located a respective modulo gy from the lower boundary of its corresponding subgrating. These modulo are separated from one another by an offset Py/gy, which provides a virtual pixel size of the same extent. Though not shown, similar offsets for pixels along the X dimension provide a virtual pixel size of Px/gx. Pixels $p_{i,j}$ are thus distributed evenly in both the X and Y dimensions relative to the row and column intersections of the subgrating gird. The combination of the arrays of subgratings $g_{i,j}$ and pixels $p_{i,j}$ can thus be modeled as a single virtual subgrating Vg (top) with the same number of virtual pixels as there are pixels $p_{i,j}$. Imaging device 100 thus provides px times py independent measurements of the interference pattern from an archetypical subgrating.

The number of unique modulo coordinates preserves the resolution provided by pixel array 107. The even spacings of the modulo coordinates in the X and Y dimensions simplifies the mathematics required to extract image information using e.g. Fourier deconvolution, and thus limits the time and processing power required for image processing.

Due to the finite size of each pixel, there will be some spatial frequencies whose period in either of the X or Y dimensions fits an integral number of times into the pixel extent in that dimension, and thus may not be observed by device 100. Such frequencies can be in the null space for imaging tasks. However, the precise spatial frequencies causing such nulls may not be part of the discrete Fourier basis of frequencies describing a finite-sized sensor array. In other words, while the frequency response of the pixels incurs a sinc penalty from the square-wave profile of the pixels, this sinc (which has zeros) will not in general be sampled at its zeros if the total lateral dimensions of the array are not integer multiples of the extent of the pixel. In imaging device 100, for example, there is no spatial frequency in the discrete-Fourier-transform basis that cannot be sampled, so the system has full rank, and, with a sufficiently high signal-to-noise ratio (SNR), can produce images with as many free parameters as there are pixels.

Figure 7A:
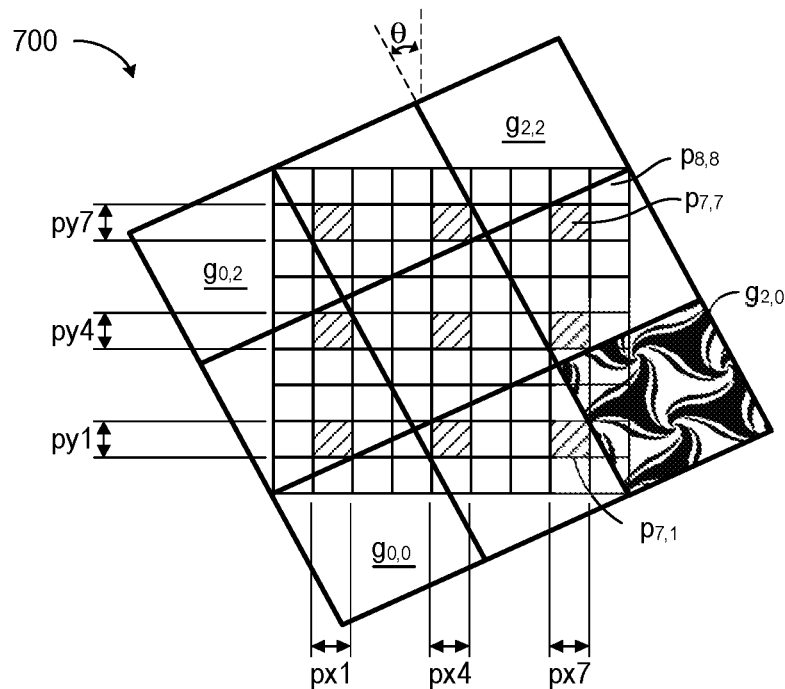
FIG. 7A depicts an imaging device 700 in accordance with another embodiment.

FIG. 7A depicts an imaging device 700 in accordance with another embodiment. A nine-by-nine array of pixels $p_{i,j}$ underlies a three-by-three array of subgratings $g_{i,j}$. The patterns of all but one subgrating $g_{2,0}$ are omitted so as not to obscure the underlying pixel locations. Nine pixels are shaded to illustrate their positions relative the overlying subgratings. The columns of subgratings $g_{i,j}$ are offset from the columns of pixels $p_{i,j}$ by an angle θ, the arctangent of which is one half in this example. This angle and the size of the subgratings are selected to map the physical pixels to unique virtual locations with respect to an archetypal subgrating. In this example, each of the shaded pixels maps to a unique virtual location with respect to its overlying subgrating.

Figure 7B:
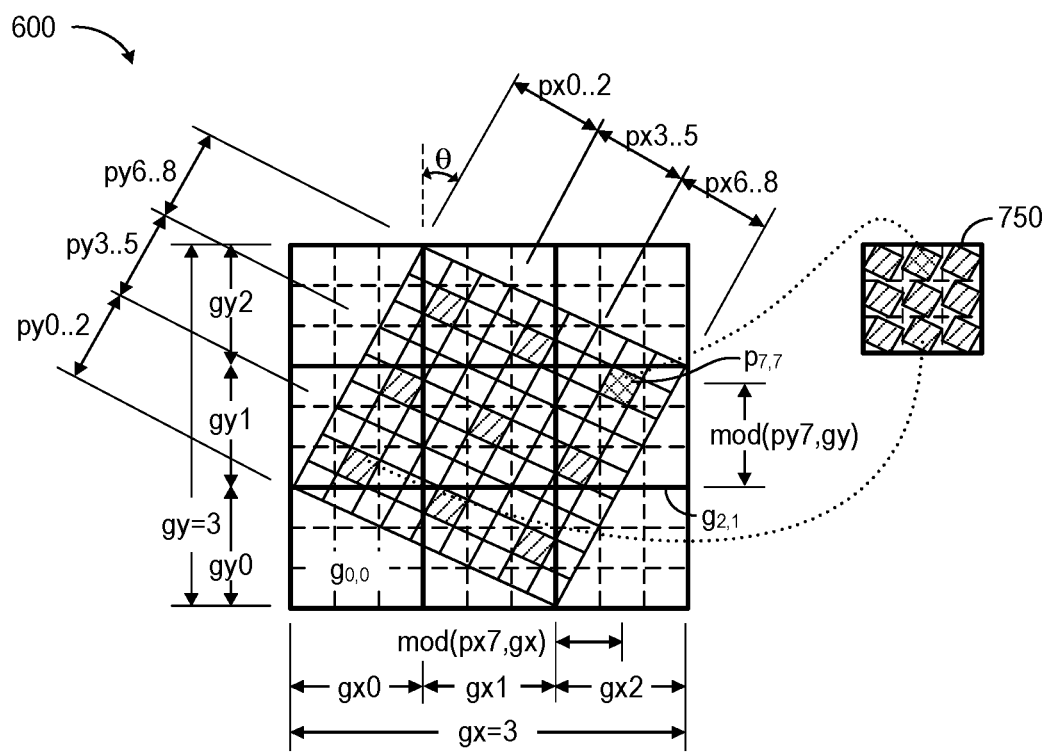
FIG. 7B depicts imaging device 700 rotated by angle θ. Each subgrating $g_{i,j}$ is divided into nine equal regions using dashed lines.

FIG. 7B depicts imaging device 700 rotated by angle θ. Each subgrating $g_{i,j}$ is divided into nine equal regions using dashed lines. The nine subgratings $g_{i,j}$ collectively cover all eighty-one pixels, and the center of each shaded pixel underlies a unique region within a corresponding subgrating. For example, taking the lower left corner of device 700 as gx0/gy0, the center of pixel $p_{7,7}$ is located at gx2+mod(px7, gx) in the X dimension and gy1+mod(py7,gy) in the Y dimension. As in prior examples, the X and Y dimensions refer to the Cartesian coordinate system defined by the array of subgratings. The values px7 and py7 can be expressed as trigonometric functions of pixel pitches px and py and angle θ.

The displacements mod(px7,gx) and mod(py7,gy) place the center of pixel $p_{7,7}$ within overlaying subgrating $g_{2,1}$. The combination of mod(px7,gx) and mod(py7,gy) for pixel $p_{7,7}$ is unique among pixels $p_{i,j}$ with reference to their corresponding subgratings, and the same is true of the remaining pixels. The centers of the shaded pixels are evenly spaced along the X and Y axes. The combination of the array of subgratings $g_{i,j}$ and the shaded pixels $p_{i,j}$ can thus be modeled as a single virtual subgrating 750 with three rows and three columns of evenly spaced virtual pixels.

Figure 8A:
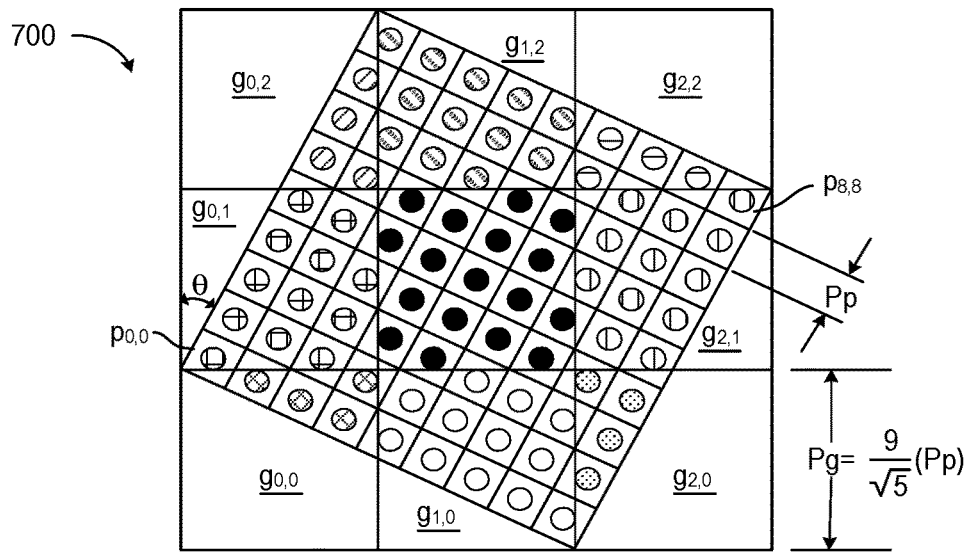
FIG. 8A depicts imaging device 700 of FIGS. 7A and 7B with the array of pixels $p_{i,j}$ oriented at angle θ relative to the array of subgratings $g_{i,j}$ as in the example of FIG. 7B.

FIG. 8A depicts imaging device 700 of FIGS. 7A and 7B with the array of pixels $p_{i,j}$ oriented at angle θ relative to the array of subgratings $g_{i,j}$ as in the example of FIG. 7B. Pixels $p_{i,j}$ are square and have a pitch Pp; subgratings $g_{i,j}$ are also square, and have a pitch $$Pg = \frac{9}{\sqrt{5}}(Pp);$$

and the angle $$\theta = \tan^{-1}\frac{1}{2}.$$

The center of each pixel is marked with a small circle, each shaded or filled to identify them as members of groups of pixels associated with corresponding subgratings. For example, pixel $p_{0,0}$ is shaded like the other pixels beneath subgrating $g_{0,1}$.

Figure 8B:
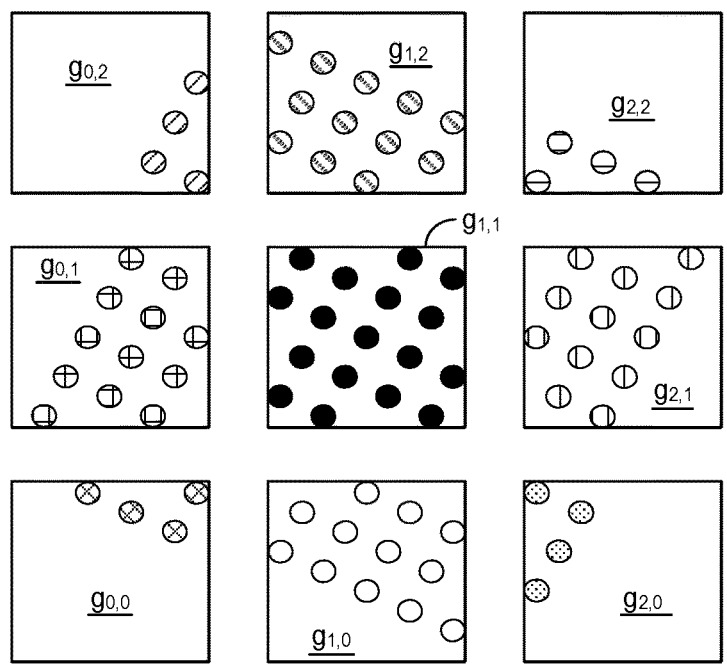
FIG. 8B depicts the nine subgratings $g_{i,j}$ of imaging device 700 of FIG. 8A separated and the pixel outlines omitted to highlight the unique constellations of pixel centers associated with each subgrating.

FIG. 8B depicts the nine subgratings $g_{i,j}$ of imaging device 700 of FIG. 8A separated and the pixel outlines omitted to highlight the constellations of pixel centers for each subgrating. Because the location of each pixel center relative to its overlying subgrating is unique among the pixels, device 700 provides the same number of interdependent measurements as there are pixels in the array.

Figure 8C:
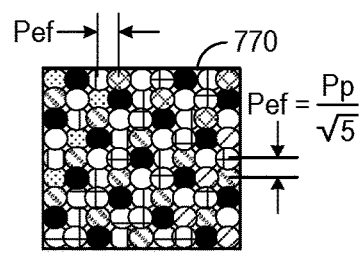
FIG. 8C depicts an archetypal subgrating 860 encompassing all the constellations of pixel centers from the nine subgratings $g_{i,j}$ of e.g.

FIG. 8C depicts an archetypal subgrating 860 encompassing all the constellations of pixel centers from the nine subgratings $g_{i,j}$ of e.g. FIGS. 8A and 8B. The constellations combine such that the center of each pixel $p_{i,j}$ occupies one of eighty-one unique locations arranged in nine rows and nine columns relative to the archetypal subgrating. The row and columns are evenly spaced by an effective pixel pitch Pef that is one-ninth grid pitch Pg, or pixel pitch Pp divided by the square root of five. The even spacings of the modulo coordinates of pixels $p_{i,j}$ relative to the subgrating array facilitates Fourier deconvolution for image recovery and analysis.

Figure 9:
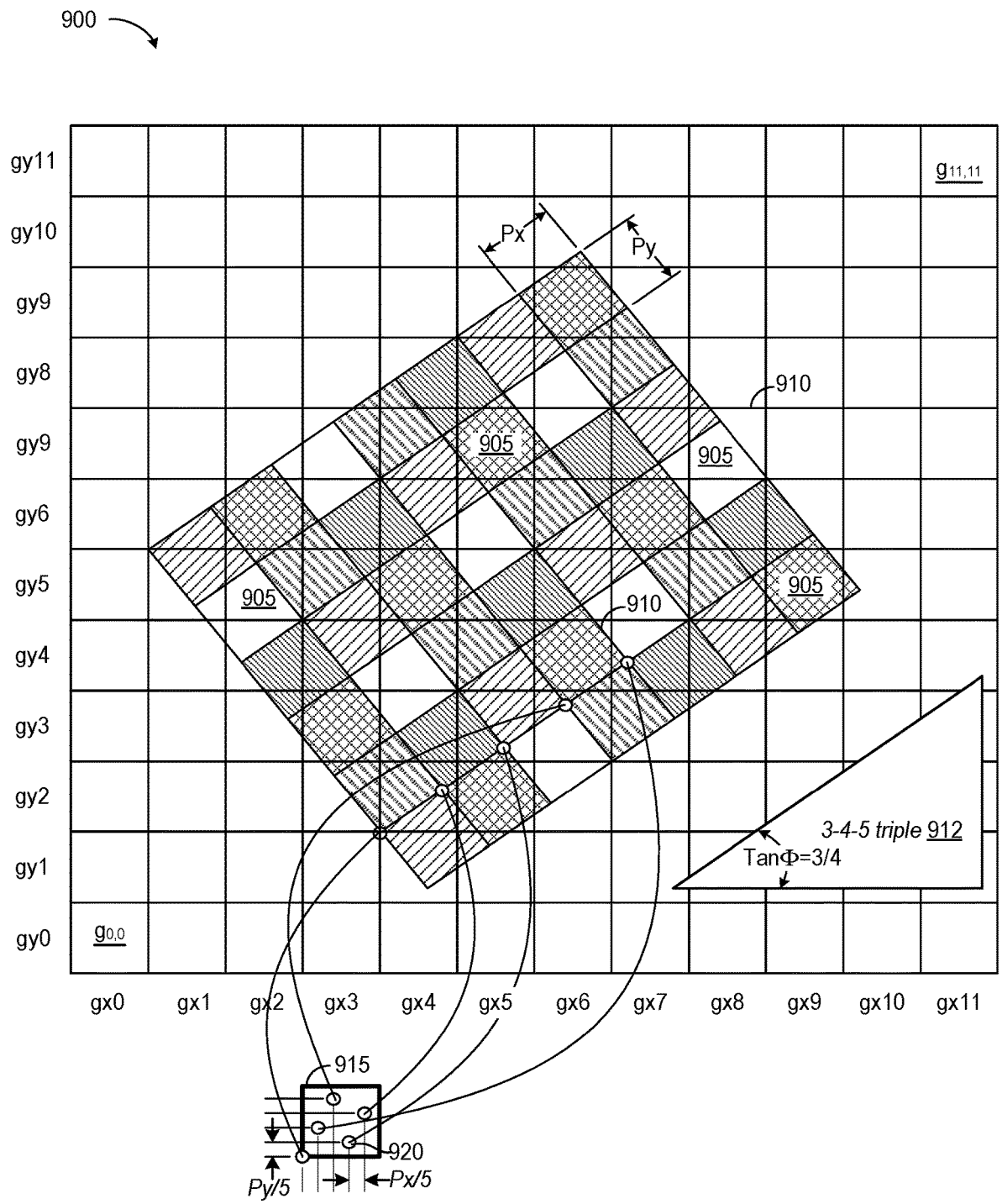
FIG. 9 depicts an imaging device 900 in accordance with another embodiment.

FIG. 9 depicts an imaging device 900 in accordance with another embodiment. A seven-by-six array of pixels 905 of pitch Px in the X dimension and pitch Py in the Y dimension is disposed beneath an array of subgratings 910. Subgratings 910 are of the same size and aspect ratio as pixels 905, but the array of subgratings is offset by an angle Φ, the tangent of which is ¾ in this example. This relative orientation is represented using as a 3-4-5 triangle 912, a Pythagorean triple. This arrangement produces five classes of subgrating/pixel alignment, with each class representing a specific relative alignment and placement of a pixel vis-a-vis the overlying subgrating. Pixels 905 that are members of the same class are highlighted using the same manner of shading. The topographical features of subgratings 910 are omitted here to show the relative placement and orientation of pixels 905.

The five leftmost pixels 905 in the lowermost row include a member from each class. The leftmost corner of each of these pixels is marked with a circle to provide a reference point relative to the respective overlaying subgrating 910. Each of these reference points is mapped to an archetypal subgrating 915, with the resulting constellation of circles 920 representing the positional diversity of each class of pixel relative to its respective and identical subgratings. The five circles 920 are distributed evenly in both the X and Y dimensions relative to the row and column intersections of the subgrating gird. The incremental spacing in the X dimension is Px/5, where Px is the pixel and subgrating pitch in the X dimension; the incremental spacing in the Y dimension is Py/5, where Py is the pixel and subgrating pitch in the Y dimension. In this particular arrangement, each pixel 905 in the array remaps to one of these five locations. The array of subgratings $g_{i,j}$ and pixels $p_{i,j}$ can thus be modeled as a single virtual subgrating 915 with five virtual pixels evenly spaced in the X and Y dimensions. Imaging device 900 thus provides five-times oversampling and increased resolution relative to the pixel array.

Figure 10:
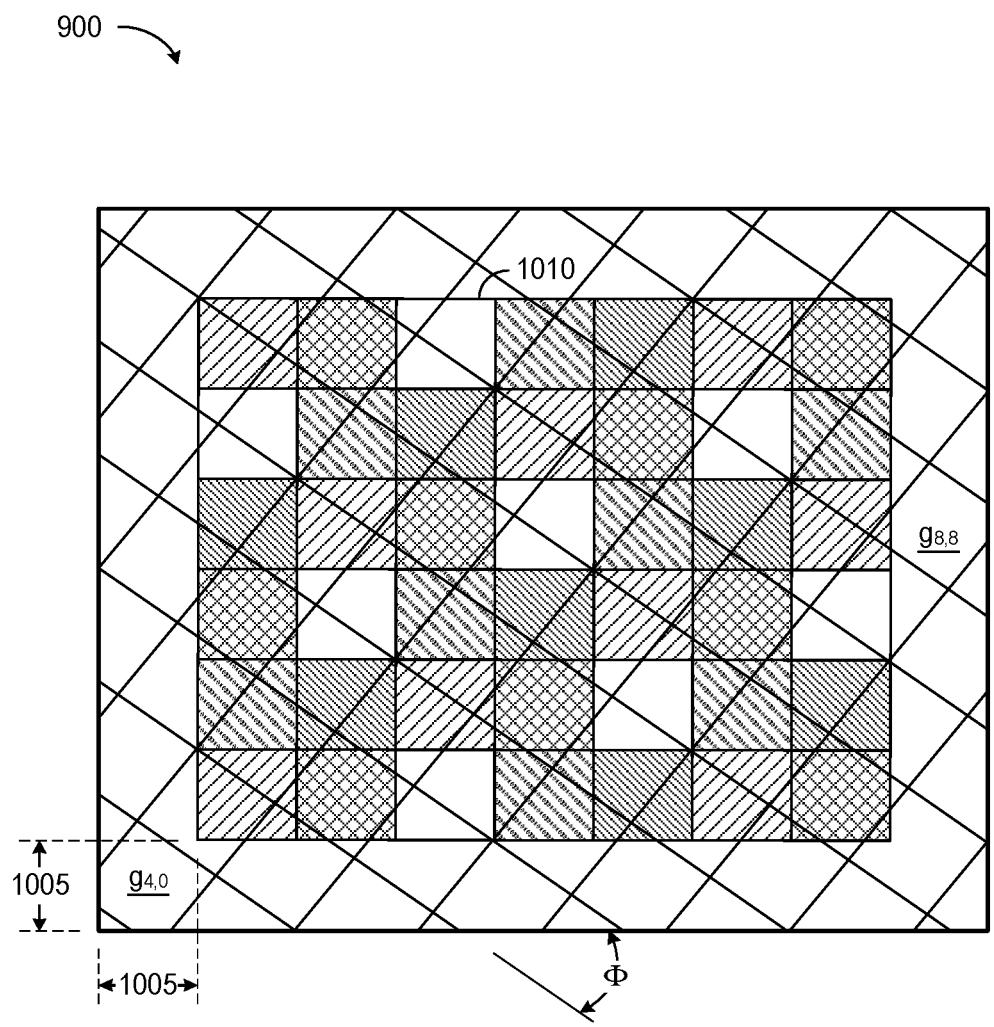
FIG. 10 depicts imaging device 1000 similar to the device 900 of FIG. 9 but reoriented such that the rows and columns of pixels 905 are horizontal and vertical in the view, as would be expected—though not necessary—for a camera of this type.

FIG. 10 depicts an imaging device 1000 similar to the device 900 of FIG. 9 but reoriented such that the rows and columns of pixels 905 are horizontal and vertical in the view, as would be expected—though not necessary—for a camera of this type. Subgrating $g_{i,j}$ are tiled with copies extending beyond the borders of the pixel array 1010 by portions 1005 of sufficient extent to cover all angles from which incident light is likely to strike array 1010. Portions 1005 extend the interference pattern in support of Fourier-domain image processing.

Figure 11:
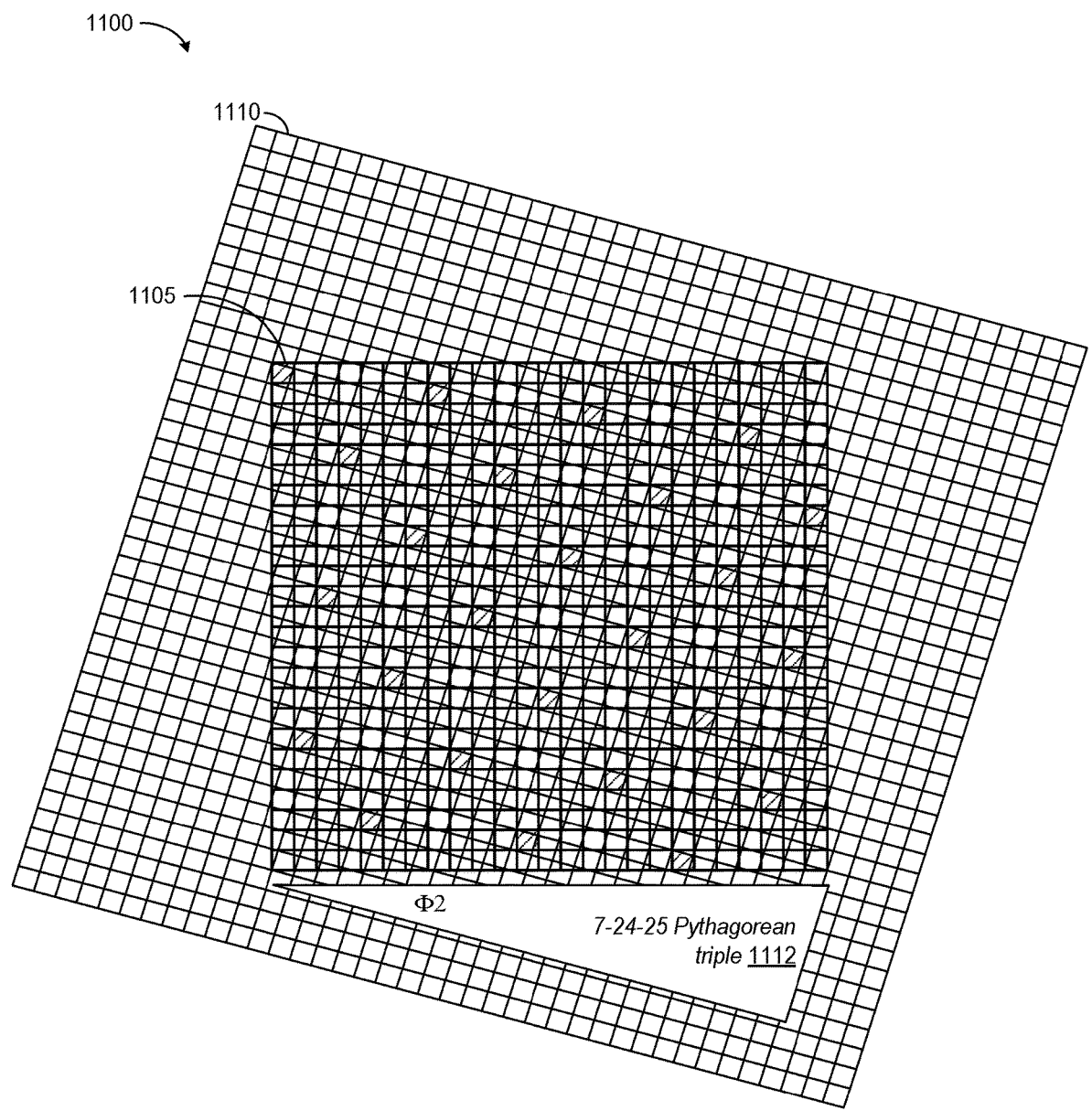
FIG. 11 depicts an imaging device 1100 in accordance with another embodiment.

FIG. 11 depicts an imaging device 1100 in accordance with another embodiment. A 25×25 array of pixels 1105 is disposed beneath an array of identically sized subgratings 1110 offset by an angle Φ2, the tangent of which is 7/24. This relative orientation is represented using as a Jul. 24, 2025 triangle 1112, another Pythagorean triple. This arrangement produces twenty-five classes of subgrating/pixel alignment. Pixels 1105 that are members of one of those classes are highlighted by shading. The location of each pixel 1105 maps to one of twenty-five locations within an archetypal subgrating. As in prior examples, these locations are spaced evenly in the X and Y dimensions of the subgrating array. The incremental spacing in the X dimension is Px/25 and in the Y dimension Py/25, where Px and Py are the pitches of the pixel array. The array of subgratings 1110 and pixels 1105 can be modeled as a single virtual subgrating with twenty-five virtual pixels evenly spaced in the X and Y dimensions. Imaging device 1100 thus provides twenty-five-times oversampling.

Figure 12:
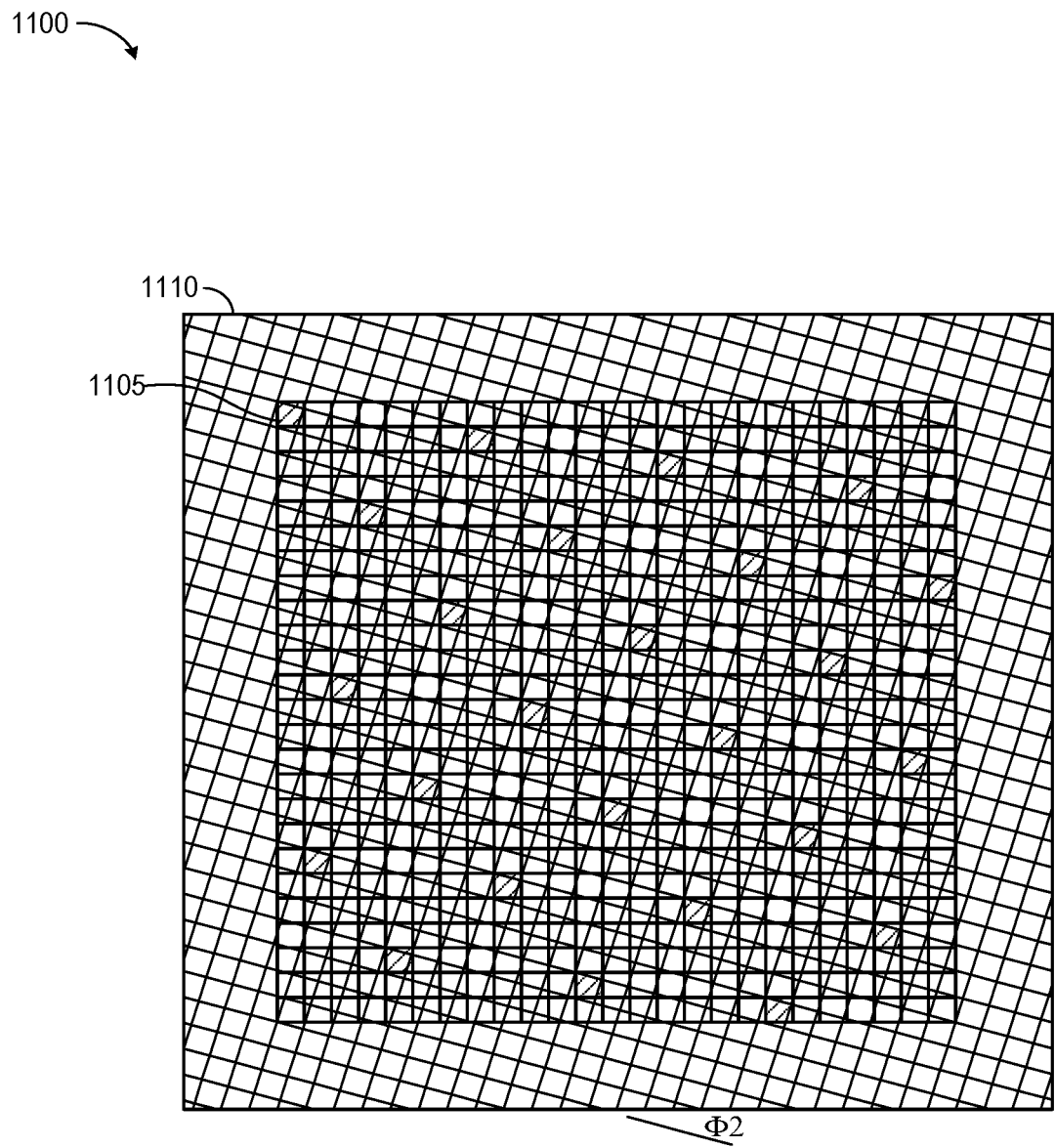
FIG. 12 depicts imaging device 1100 of FIG. 11 with subgratings 1110 trimmed around the perimeter.

FIG. 12 depicts imaging device 1100 of FIG. 11 with subgratings 1110 trimmed around the perimeter. The subgratings extend beyond the boundaries of the pixel array so that the foci and curtains produced by subgratings 1110 are continuous over the angles of incident light.

Figure 13:
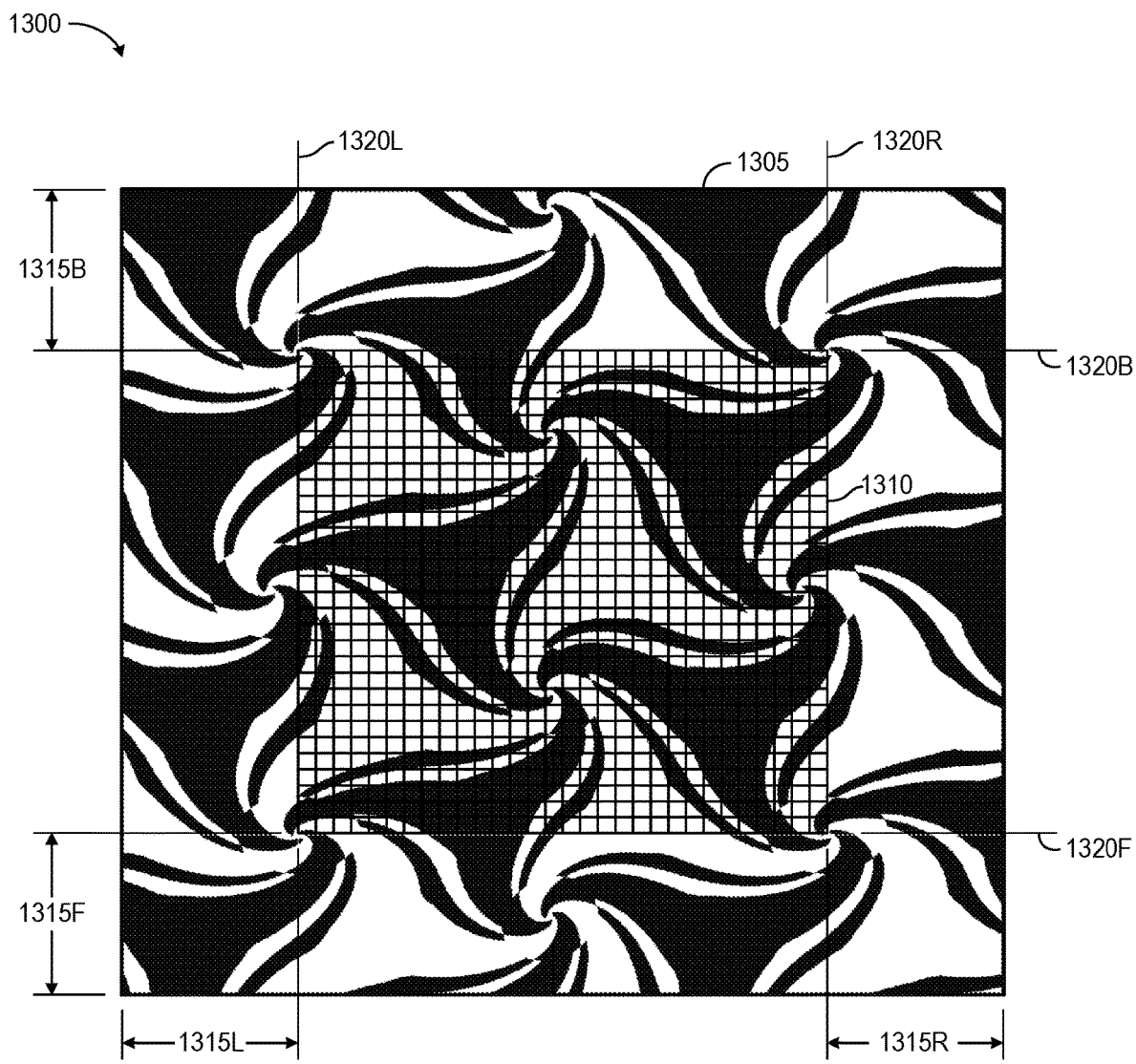
FIG. 13 depicts an imaging device 1300 in accordance with another embodiment.

FIG. 13 depicts an imaging device 1300 in accordance with another embodiment. Viewed from a perspective normal to the active surface, device 1300 includes a phase grating layer 1305 above a pixel array 1310. Grating layer 1305 includes a pattern of grating features that produce interference patterns as detailed previously, and is formed of a material suitable for the wavelength band of interest (e.g., for visible light).

Phase grating layer 1305 includes left and right portions 1315L and 1315R that extend beyond the respective left and right edges of the underlying pixel array 1310. Portion 1315R extends to the right of pixel array 1310, repeating the pattern that extends to the right of the left boundary 1320L of pixel array 1310; portion 1315L extends to the left of pixel array 1310, repeating the pattern that extends to the left of the right boundary 1320R; portion 1315B extends beyond edge 1320B of pixel array 1310, repeating the pattern that extends over the pixel array from front boundary 1320F; and portion 1315F extends beyond edge 1320F of pixel array 1310, repeating the pattern that extends over the pixel array from back boundary 1320B. These extensions of the grating pattern extend the interference pattern in support of Fourier-domain strategies.

The pixels of array 1310 are relatively large in this example. The pitches in each dimension are no bigger than about one-third the widest dimension of one of the spiral arms formed by the grating features, and can be much smaller. In one embodiment, for example, pixel array 1310 is 160×160 pixels.

Figure 14:
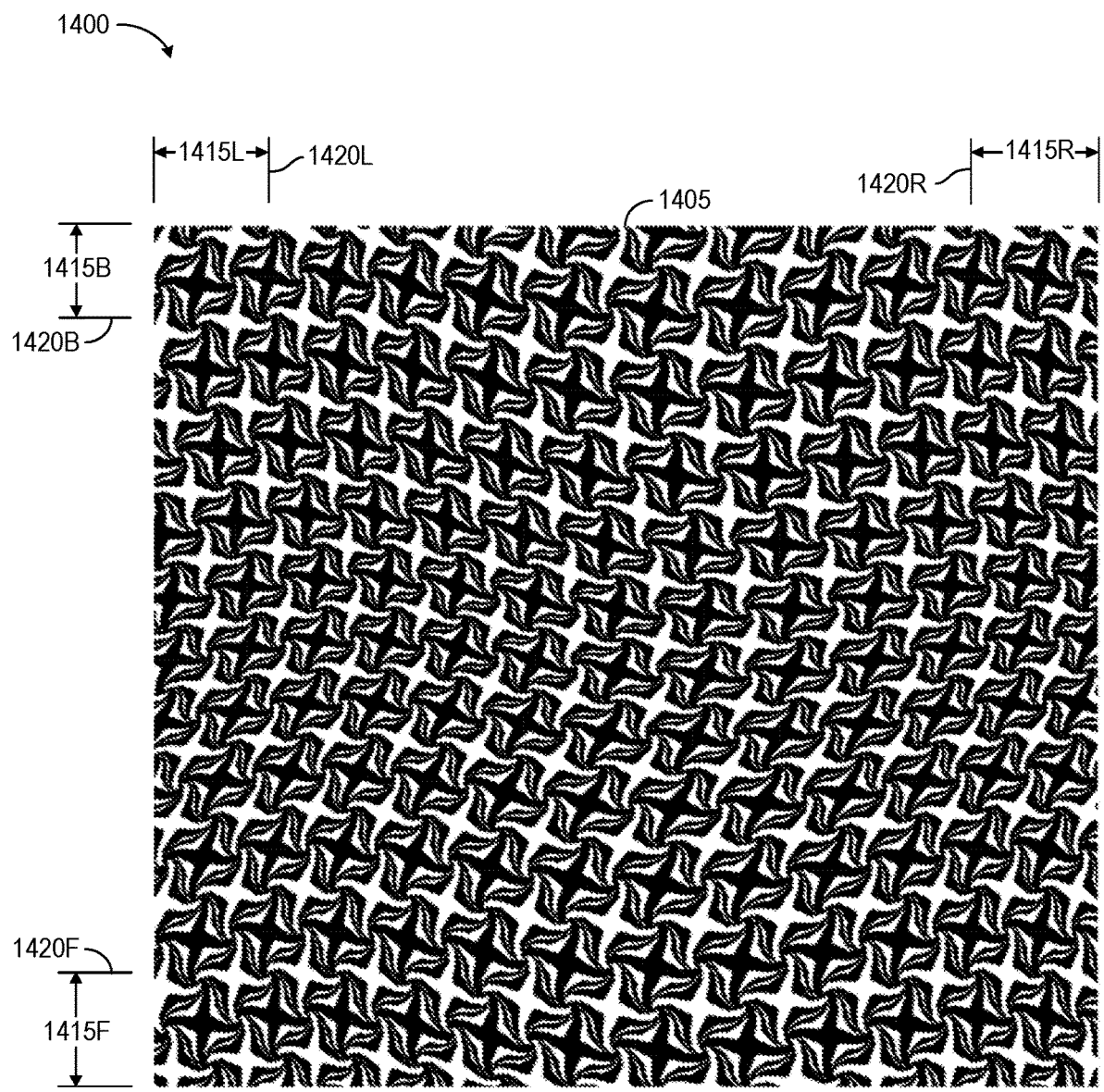
FIG. 14 depicts an imaging device 1400 in accordance with another embodiment.

FIG. 14 depicts an imaging device 1400 in accordance with another embodiment. Device 1400 includes a phase grating layer 1405 above a pixel array (not shown). Grating layer 1405 includes a pattern of grating features that produce interference patterns as detailed previously. Layer 1405 includes left and right portions 1415L and 1415R that extend beyond the respective left and right edges 1420L and 1420R of the underlying pixel array. Portion 1415R extends to the right of the pixel array, repeating the pattern that extends to the right of the left pixel boundary 1420L; portion 1415L extends to the left of the pixel array, repeating the pattern that extends to the left of the right pixel boundary 1420R; portion 1415B extends beyond edge 1420B, repeating the pattern that extends over the pixel array from front pixel boundary 1420F; and portion 1415F extends beyond edge 1420F, repeating the pattern that extends over the pixel array from back pixel boundary 1420B. These extensions of the grating pattern extend the interference pattern in support of Fourier-domain strategies.

The grating features form asymmetrically shaped four-point "stars" with curved boundaries. Such shapes can be described mathematically by starting with identical, evenly spaced elements that approximate the desired shapes. The x/y locations of the points making up these elements are then translated by an amount that depends on x and y, where this translation is smooth.

One approach to creating a pattern of the type illustrated for grating layer 1405 is as follows. First, a pattern composed of identical, evenly spaced elements is laid out to span the dimensions of the area to be patterned. The pattern can be composed of polygons that collectively describe the grating shape. Next, every point (x,y) in the pattern is translated by an amount that depends on x and y, where this translation is smooth, and also has X, Y periodicity in x and y, where X and Y are the width and height of the underlying pixel array. This translation can be accomplished by replacing every location (x,y) in the pattern with (x+F(x,y), y+G(x,y)), where F and G have the following properties.

1. Periodicity: F(x+X,y)=F(x,y)=F(x,y+Y); and G(x+X,y)=G(x,y)=G(x,y+Y).
2. Smoothness, with at least some minimal amplitude: the derivatives of F and G with respect to x and y are not too big (which would distort the local grating shapes too much) nor too small (which would make the gratings essentially the same as their neighbors).
3. No internal repetitions: if F(x+D,y)=F(x,y) for all x and y, then D must be an integral multiple of X; similar constraints apply to F's y repetition, and G's x and y repetitions.

Property 3 avoids introducing equivalent phase gratings within an X-Y tile. As detailed above, with a coprime or tilted sampling strategy this condition is not always necessary to guarantee that each measurement gives new information. Furthermore, in some embodiments known internal repetitions introduce deliberate redundancy, used to enhance signal to noise ratio or provide robustness against dead pixels.

One way to satisfy the above is to make F and G of the following form: A cos(2*pi*x/X+phi1)+B cos(2*pi*y/Y+phi2). A and B are amplitudes, X is the width and Y the height of the active pixels, and phi1 and phi2 are phase factors. The parameters A, B, phi1 and phi2 may be different for F and G, but X and Y are the same for F and G.

While the subject matter has been described in connection with specific embodiments, other embodiments are also envisioned. For example, the wavelength band of interest can be broader or narrower than those of the foregoing examples, and may be discontinuous. A linear array of pixels can be used alone or in combination with other linear arrays to sense one-dimensional aspects of a scene from one or more orientations. Moreover, if a given subgrating exhibits some Fourier nulls, then two or more general regions that potentially have different aspect ratios, grating designs or orientations, or any combination of the above, could provide independent measurements of the scene. Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An imaging device comprising:
   a pixel array having a first edge and a second edge opposite the first edge; and
   a phase grating layer fixedly attached to the pixel array over the pixel array and including a pattern of subgratings, wherein:
      a first portion of the phase grating layer extends beyond the second edge away from the pixel array, the first portion beginning a repeat of the pattern from the first edge to the second edge; and
      a second portion of the phase grating layer extends beyond the first edge away from the pixel array, such second portion beginning a repeat of the pattern from the second edge to the first edge.

2. The imaging device of claim 1, further comprising:
   a first subgrating number gx of the subgratings along a first axis X between the first edge and the second edge; and
   a first pixel number px, coprime with the first subgrating number gx, of the pixels along the first axis X and between the first edge and the second edge.

3. The imaging device of claim 2, the pixel array having a third edge and a fourth edge opposite the third edge, wherein
   a third portion of the phase grating layer extends beyond the fourth edge away from the pixel array, the third portion beginning a repeat of the pattern from the third edge to the fourth edge; and
   a fourth portion of the phase grating layer extends beyond the third edge away from the pixel array, such fourth portion beginning a repeat of the pattern from the fourth edge to the third edge.

4. The imaging device of claim 1, wherein the pixel array includes rows of pixels and the pattern of the subgratings comprises rows of subgratings that extend at an angle relative to the rows of pixels.

5. The imaging device of claim 4, wherein the angle is of a Pythagorean triple.

6. The imaging device of claim 1, wherein the subgratings are identical.

7. The imaging device of claim 1, the phase grating to cast an interference pattern on the pixel array, each subgrating including boundaries of odd symmetry separating stepped features on opposite sides of each boundary, the stepped features on the opposite sides of each boundary offset from the pixel array by half of a wavelength within a wavelength band of interest, plus an integer multiple of the wavelength, to produce curtains of destructive interference at the pixel array.

8. The imaging device of claim 1, further comprising superfluous pixels.

9. The imaging device of claim 8, wherein the superfluous pixels comprise defective pixels.

10. The imaging device of claim 1, wherein the phase grating comprises silicon.

11. The imaging device of claim 10, wherein the phase grating consists of silicon.

12. An imaging device comprising:
    a pixel array having a first edge and a second edge opposite the first edge;
    a phase grating layer over the pixel array and including a pattern of subgratings, wherein:
       a first portion of the phase grating layer extends beyond the second edge away from the pixel array, the first portion beginning a repeat of the pattern from the first edge to the second edge; and
       a second portion of the phase grating layer extends beyond the first edge away from the pixel array, such second portion beginning a repeat of the pattern from the second edge to the first edge;
    a first subgrating number gx of the subgratings along a first axis X between the first edge and the second edge;
    a first pixel number px, coprime with the first subgrating number gx, of the pixels along the first axis X and between the first edge and the second edge;
    the pixel array having a third edge and a fourth edge opposite the third edge, wherein
       a third portion of the phase grating layer extends beyond the fourth edge away from the pixel array, the third portion beginning a repeat of the pattern from the third edge to the fourth edge;
       a fourth portion of the phase grating layer extends beyond the third edge away from the pixel array, such fourth portion beginning a repeat of the pattern from the fourth edge to the third edge;
    a second subgrating number gy of the subgratings along a second axis Y between the third edge and the fourth edge; and a second pixel number py, coprime with the second subgrating number gy, of the pixels along the second axis Y and between the third edge and the fourth edge.

13. An imaging device comprising:
a pixel array having a first edge and a second edge opposite the first edge; and
a phase grating layer over the pixel array and including a pattern of subgratings, wherein:
   a first portion of the phase grating layer extends beyond the second edge away from the pixel array, the first portion beginning a repeat of the pattern from the first edge to the second edge; and
   a second portion of the phase grating layer extends beyond the first edge away from the pixel array, such second portion beginning a repeat of the pattern from the second edge to the first edge;
wherein each subgrating includes a minimum dimension, and wherein the first portion extends beyond the second edge by at least the minimum dimension.

14. The imaging device of claim 13, wherein second portion extends beyond the first edge by at least the minimum dimension.

* * * * *